United States Patent
Chengalva

(10) Patent No.: US 9,163,909 B2
(45) Date of Patent: Oct. 20, 2015

(54) UNMANNED MULTI-PURPOSE GROUND VEHICLE WITH DIFFERENT LEVELS OF CONTROL

(75) Inventor: Mahesh K. Chengalva, Gilbert, AZ (US)

(73) Assignee: THE BOEING COMPANY, Chicago, IL (US)

( * ) Notice: Subject to any disclaimer, the term of this patent is extended or adjusted under 35 U.S.C. 154(b) by 680 days.

(21) Appl. No.: 12/635,953

(22) Filed: Dec. 11, 2009

(65) Prior Publication Data

US 2011/0144828 A1  Jun. 16, 2011

(51) Int. Cl.
*G05D 1/00* (2006.01)
*F41H 7/00* (2006.01)
*G05D 1/02* (2006.01)

(52) U.S. Cl.
CPC .............. *F41H 7/005* (2013.01); *G05D 1/0088* (2013.01); *G05D 1/0242* (2013.01); *G05D 1/0246* (2013.01); *G05D 1/0255* (2013.01); *G05D 1/0257* (2013.01); *G05D 1/0274* (2013.01); *G05D 1/0278* (2013.01); *G05D 2201/0209* (2013.01)

(58) Field of Classification Search
CPC .............. G05D 2201/0209; G05D 2201/0212; G05D 2201/0218; G05D 1/0061; G05D 1/0088; G05D 1/0242; G05D 1/0246; G05D 1/0255; G05D 1/0257; G05D 1/0278; G05D 1/0274; F41H 7/005
USPC .............................................. 701/1, 2, 23–28
See application file for complete search history.

(56) References Cited

U.S. PATENT DOCUMENTS

| | | | | |
|---|---|---|---|---|
| RE26,064 E | * | 7/1966 | Bond et al. | 244/185 |
| 3,757,635 A | * | 9/1973 | Hickerson et al. | 89/36.08 |
| 6,456,910 B1 | * | 9/2002 | Roe | 701/23 |
| 6,671,582 B1 | * | 12/2003 | Hanley | 700/245 |
| 6,965,816 B2 | * | 11/2005 | Walker | 701/16 |
| 7,240,879 B1 | * | 7/2007 | Cepollina et al. | 244/172.5 |
| 7,293,743 B2 | * | 11/2007 | Cepollina et al. | 244/172.5 |
| 7,350,748 B2 | * | 4/2008 | Matos | 244/76 R |
| 7,436,143 B2 | * | 10/2008 | Lakshmanan et al. | 318/581 |
| 7,438,264 B2 | * | 10/2008 | Cepollina et al. | 244/172.5 |
| 7,499,774 B2 | * | 3/2009 | Barrett et al. | 701/23 |
| 7,499,775 B2 | * | 3/2009 | Filippov et al. | 701/23 |

(Continued)

OTHER PUBLICATIONS

Matthies et al., "A Portable, Autonomous, Urban Reconnaissance Robot", pp. 1-8, retrieved Nov. 2009, http://www-robotics.jpl.nasa.gov/publications/Arturo_Rankin/UrbanRobotPaper0700.pdf.

(Continued)

*Primary Examiner* — John Q Nguyen
*Assistant Examiner* — Michael Whalen
(74) *Attorney, Agent, or Firm* — Yee & Associates, P.C.

(57) ABSTRACT

A vehicle comprises a platform, a propulsion system, a communications system, a sensor system, and a computer system. The propulsion system, communications system, sensor system, and computer system are associated with the platform. The propulsion system is configured to move the platform on a ground. The communications system is configured to establish a wireless communications link to a remote location. The sensor system is configured to generate sensor data. The computer system is configured to run a number of control processes to perform a mission and configured to perform operations in response to a number of commands from the number of operators if the number of requests is valid.

26 Claims, 10 Drawing Sheets

(56) References Cited

U.S. PATENT DOCUMENTS

| | | | |
|---|---|---|---|
| 7,499,776 B2 * | 3/2009 | Allard et al. | 701/23 |
| 7,499,804 B2 * | 3/2009 | Svendsen et al. | 701/301 |
| 7,513,459 B2 * | 4/2009 | Cepollina et al. | 244/158.6 |
| 7,513,460 B2 * | 4/2009 | Cepollina et al. | 244/172.5 |
| 7,620,477 B2 * | 11/2009 | Bruemmer | 700/245 |
| 7,689,594 B2 * | 3/2010 | Davidson et al. | 707/781 |
| 7,789,723 B2 * | 9/2010 | Dane et al. | 440/6 |
| 7,837,143 B2 * | 11/2010 | Matos | 244/75.1 |
| 7,979,175 B2 * | 7/2011 | Allard et al. | 701/23 |
| 8,078,338 B2 * | 12/2011 | Pack et al. | 701/1 |
| 8,164,464 B2 * | 4/2012 | Matos | 340/576 |
| 8,289,172 B2 * | 10/2012 | Matos | 340/576 |
| 8,346,391 B1 * | 1/2013 | Anhalt et al. | 700/248 |
| 8,355,818 B2 * | 1/2013 | Nielsen et al. | 700/258 |
| 2003/0093187 A1 * | 5/2003 | Walker | 701/1 |
| 2004/0210847 A1 * | 10/2004 | Berson et al. | 715/788 |
| 2005/0004723 A1 | 1/2005 | Duggan et al. | |
| 2005/0258306 A1 * | 11/2005 | Barocela et al. | 244/30 |
| 2006/0089763 A1 * | 4/2006 | Barrett et al. | 701/23 |
| 2006/0089764 A1 * | 4/2006 | Filippov et al. | 701/23 |
| 2006/0089765 A1 * | 4/2006 | Pack et al. | 701/23 |
| 2006/0089766 A1 * | 4/2006 | Allard et al. | 701/23 |
| 2006/0220883 A1 * | 10/2006 | Matos | 340/573.1 |
| 2006/0249625 A1 * | 11/2006 | Matos | 244/118.5 |
| 2007/0018052 A1 * | 1/2007 | Eriksson | 244/190 |
| 2007/0029449 A1 * | 2/2007 | Matos | 244/195 |
| 2007/0125910 A1 * | 6/2007 | Cepollina et al. | 244/172.6 |
| 2007/0138344 A1 * | 6/2007 | Cepollina et al. | 244/172.5 |
| 2007/0164164 A1 * | 7/2007 | Cepollina et al. | 244/158.1 |
| 2007/0243505 A1 * | 10/2007 | Rath et al. | 434/29 |
| 2007/0244608 A1 * | 10/2007 | Rath et al. | 701/3 |
| 2008/0009965 A1 * | 1/2008 | Bruemmer et al. | 700/245 |
| 2008/0009970 A1 * | 1/2008 | Bruemmer | 700/245 |
| 2008/0011904 A1 * | 1/2008 | Cepollina et al. | 244/172.6 |
| 2008/0086241 A1 * | 4/2008 | Phillips et al. | 701/2 |
| 2008/0121097 A1 * | 5/2008 | Rudakevych et al. | 89/28.05 |
| 2008/0122636 A1 * | 5/2008 | Matos | 340/576 |
| 2009/0120653 A1 * | 5/2009 | Thomas | 169/61 |
| 2009/0198400 A1 * | 8/2009 | Allard et al. | 701/23 |
| 2009/0276110 A1 | 11/2009 | Martinez et al. | |
| 2009/0326735 A1 * | 12/2009 | Wood et al. | 701/2 |
| 2010/0004798 A1 * | 1/2010 | Bodin et al. | 701/2 |
| 2010/0017046 A1 * | 1/2010 | Cheung et al. | 701/2 |
| 2010/0023185 A1 * | 1/2010 | Terwelp et al. | 701/2 |
| 2010/0063650 A1 * | 3/2010 | Vian et al. | 701/2 |
| 2010/0087980 A1 * | 4/2010 | Spura | 701/24 |
| 2010/0147993 A1 * | 6/2010 | Annati et al. | 244/12.2 |
| 2010/0152919 A1 * | 6/2010 | Davidson et al. | 701/1 |
| 2011/0035149 A1 * | 2/2011 | McAndrew et al. | 701/205 |
| 2011/0137506 A1 * | 6/2011 | DeMarco et al. | 701/23 |
| 2011/0144802 A1 * | 6/2011 | Jang | 700/245 |
| 2011/0172850 A1 * | 7/2011 | Paz-Meidan et al. | 701/2 |
| 2011/0264305 A1 * | 10/2011 | Choe et al. | 701/2 |
| 2011/0288714 A1 * | 11/2011 | Flohr et al. | 701/27 |
| 2012/0209456 A1 * | 8/2012 | Harmon et al. | 701/3 |

OTHER PUBLICATIONS

"Electric Wheelchair Future Technology", pp. 1-5, retrieved Nov. 2009 http://electric-wheelchair-on.net/main/intelligent-autonomous-remote-controlled-electric-wheelchair.

Chengalva et al., "Low-Cost Autonomous Vehicles for Urban Environments", SAE International Journal of Commercial Vehicles, Apr. 2009, vol. 1 No. 1, 516-526.

Extended European Search Report, dated Mar. 27, 2014, regarding Application No. EP10193823.1, 8 pages.

* cited by examiner

UNMANNED MULTI-PURPOSE GROUND VEHICLE WITH DIFFERENT LEVELS OF CONTROL

BACKGROUND INFORMATION

1. Field

The present disclosure relates generally to vehicles and, in particular, to ground vehicles. Still more particularly, the present disclosure relates to unmanned ground vehicles for performing missions.

2. Background

In performing surveillance and obtaining information about geographic areas, unmanned aerial vehicles (UAVs) have been used in various locations. An unmanned aerial vehicle is capable of travelling over large areas. These types of vehicles are capable of obtaining information about the locations of vehicles, troops, bridges, roads, and/or other types of information.

Unmanned aerial vehicles, however, are restricted in their usefulness by the amount of time that can be spent flying over target areas. The duration of flight for a vehicle is currently up to about 40 hours. As a result, an unmanned aerial vehicle returns to base to refuel before continuing a mission or performing another mission.

As a result, the monitoring of the target area is not continuous with only a single unmanned aerial vehicle. A second unmanned aerial vehicle may be used to monitor the area, while the first unmanned aerial vehicle refuels. Additionally, additional unmanned aerial vehicles may be needed in case maintenance operations need to be performed. As a result, a fleet of unmanned aerial vehicles is needed to work in a relay fashion to maintain a constant presence to monitor a given target area.

This type of monitoring provides the desired information about target areas. However, the cost of this type of monitoring is often higher than desirable. For example, each unmanned aerial vehicle has a cost and requires a number of operators to provide constant monitoring of a target area. Also, logistics for launching, controlling, and recovering unmanned aerial vehicles also increases the complexity of maintaining constant monitoring of the target area. Further, unmanned aerial vehicles may be detected and may forewarn a target of their presence or may become a target of enemy fire.

Therefore, it would be advantageous to have a method and apparatus that takes into account at least one of the issues discussed above, as well as possibly other issues.

SUMMARY

In one illustrative embodiment, a vehicle comprises a platform, a propulsion system, a communications system, a sensor system, and a computer system. The propulsion system is associated with the platform and configured to move the platform on the ground. The communications system is associated with the platform and configured to establish a wireless communications link to a remote location. The sensor system is associated with the platform and configured to generate sensor data. The computer system is associated with the platform. The computer system is configured to run a number of control processes to perform a mission and configured to perform a number of operations in response to a number of commands from the number of operators if the number of requests is valid.

In another illustrative embodiment, an autonomous ground vehicle comprises a platform, a propulsion system, a communications system, a sensor system, a power system, and a computer system. The propulsion system, the communications system, the sensor system, and the computer system are associated with the platform. The propulsion system is configured to move the platform on the ground and has two types of engines. The communications system is configured to establish a wireless communications link to a remote location. The sensor system is configured to generate sensor data. The power system has a number of batteries and an energy harvesting system. The computer system is configured to run a number of control processes to perform a mission, send information over the wireless communications link to the remote location, receive a request to change control of the autonomous ground vehicle from the number of control processes to a number of operators, determine whether the request is valid, and perform a number of operations in response to a number of commands from the number of operators if the request is valid.

In yet another illustrative embodiment, a method is present for operating a vehicle. A mission is loaded onto the vehicle. The vehicle comprises a platform, a propulsion system, a sensor system, a power system, and a computer system. The propulsion system, the sensor system, and the computer system are associated with the platform. The propulsion system is configured to move the platform on a ground. The sensor system is configured to generate sensor data. The power system has a number of batteries and an energy harvesting system. The computer system is configured to run a number of control processes to perform the mission. The number of control processes is run to perform the mission.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof, will best be understood by reference to the following detailed description of an illustrative embodiment of the present disclosure when read in conjunction with the accompanying drawings, wherein:

DETAILED DESCRIPTION

The different illustrative embodiments recognize and take into account a number of different considerations. For example, the different illustrative embodiments recognize and take into account that one alternative to using unmanned aerial vehicles is to use a ground vehicle for some applications. Currently available ground vehicles, however, are limited in capability. For example, multifunction utility/logistics and equipment vehicles may be used with infantry. These types of vehicles, however, are designed to assist infantry units and do not have the capability or functionality needed to perform surveillance missions that may require longer amounts of time and distances without operator intervention.

The different illustrative embodiments also recognize and take into account that during supply missions on a battlefield, casualties may be caused by opposing military forces using, for example, improvised explosive devices. With the view of minimizing human casualties, it would be advantageous to have a method and apparatus that is able to conduct supply missions without placing a human operator in harm's way.

The different illustrative embodiments also recognize and take into account that there may be a need on the battlefield to maximize damage inflicted on the enemy, while simultaneously ensuring minimal losses to friendly forces. Therefore, it would be advantageous to have a method and apparatus that is capable of offensive action without any risk to friendly forces.

The different illustrative embodiments also recognize and take into account that there may be a need to have a single composite solution to all three issues mentioned above, as well as possibly other issues.

Thus, the different illustrative embodiments provide a method and apparatus for performing missions. In one illustrative embodiment, a vehicle comprises a platform, a propulsion system, a communications system, a sensor system, and a computer system. The propulsion system is associated with a platform and configured to move the platform on the ground. The communications system is associated with the platform and configured to establish a communications link with a remote location. The sensor system also is associated with the platform and configured to generate sensor data.

The computer system is associated with the platform and configured to run a number of control processes to perform a mission. The number of control processes is configured to receive a request to change control of the vehicle from the number of control processes to a number of operators. Further, the number of control processes is configured to send information over the wireless communications link to the remote location. The number of control processes also is configured to determine whether the request is valid and perform a number of operations in response to a number of commands from the operator if the request is valid.

Figure 1:
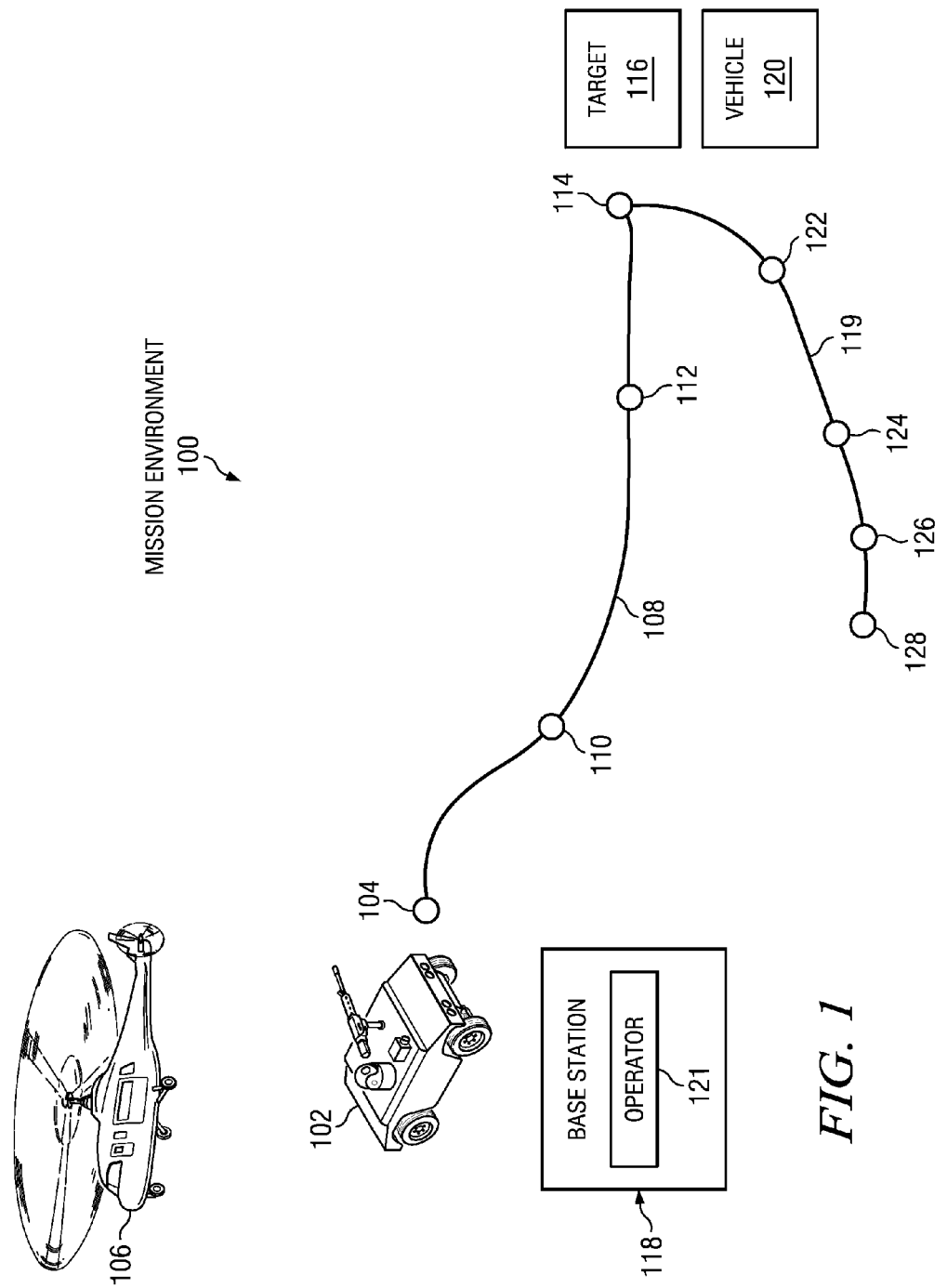
FIG. 1 is an illustration of a mission environment in accordance with an illustrative embodiment.

With reference now to FIG. 1, an illustration of a mission environment is depicted in accordance with an illustrative embodiment. In this illustrative example, mission environment 100 includes ground vehicle 102. Ground vehicle 102 is deployed at location 104. Ground vehicle 102 is deployed at location 104 by helicopter 106 in these illustrative examples. Of course, in other illustrative embodiments, ground vehicle 102 may be deployed in other ways. For example, ground vehicle 102 may be deployed on a pulley with a parachute, by another vehicle, driven manually to the deployment location, or by some other suitable system.

Ground vehicle 102 is configured to perform a surveillance mission in these depicted examples. Ground vehicle 102, in this illustrative example, travels along path 108 from location 104. Path 108 is defined by waypoints 110, 112, and 114.

At waypoint 114, ground vehicle 102 detects target 116. In this example, target 116 is a building. Ground vehicle 102 performs surveillance on target 116 in these examples.

Surveillance data may be video data generated about target 116. This video data is sent by a wireless communications link back to base station 118. The video data may be sent through a wireless communications link directly to base station 118 or indirectly through another device, such as a satellite. Surveillance data also may be received simultaneously through multiple base stations.

During the performance of surveillance on target 116, vehicle 120 may be identified in the video data generated by ground vehicle 102 while performing surveillance on target 116. Operator 121 at base station 118 may request control of ground vehicle 102 to interrupt the current mission of performing surveillance on target 116. Operator 121 may redirect ground vehicle 102 to follow vehicle 120. An operator in helicopter 106 also may request control of the system in ground vehicle 102. For example, the operator in helicopter 106 may request control of a weapons system for ground vehicle 102. The operator in helicopter 106 may direct the weapons system to destroy vehicle 120.

After the destruction of vehicle 120 has occurred, the control of ground vehicle 102 by operator 121 at base station 118 and the operator in helicopter 106 is returned to ground vehicle 102. At this time, ground vehicle 102 returns to waypoint 114 to continue performing surveillance on target 116. After the surveillance mission on target 116 has been completed, ground vehicle 102 may continue on path 119 to location 128 for pickup by helicopter 106. Path 119 may have waypoints 122, 124, and 126 to reach location 128 for pickup or extraction. In different embodiments, ground vehicle 102 may return on path 108 or not return at all and move to a different location. In different embodiments, there may be multiple and/or different drop-off and pick-up locations.

In accordance with one or more illustrative embodiments, ground vehicle 102 has greater flexibility than currently available ground vehicles. Ground vehicle 102 provides a capability to perform surveillance operations without operator input. Additionally, ground vehicle 102 is also configured to allow a number of operators to control a number of systems within ground vehicle 102. In different advantageous embodiments, ground vehicle 102 may navigate without input from an operator for a majority of an operation.

Figure 2:
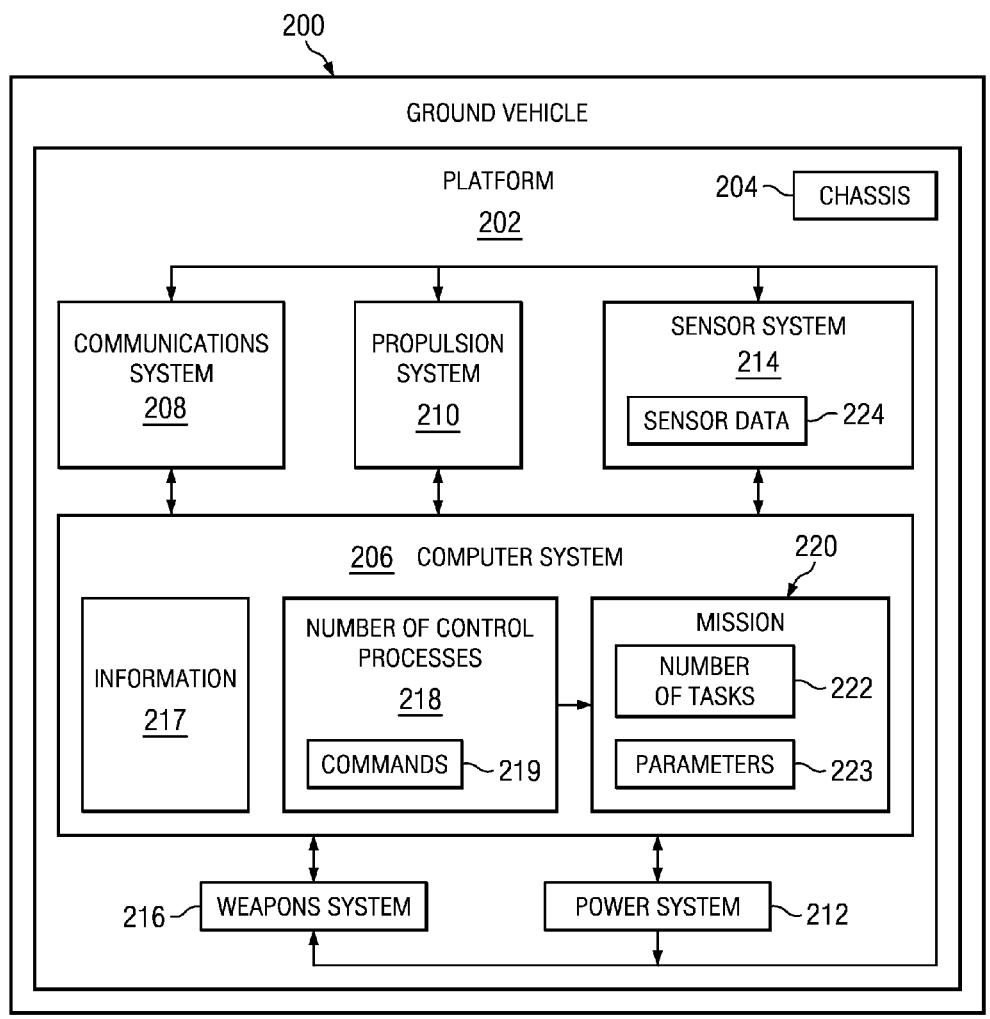
FIG. 2 is an illustration of a block diagram of a ground vehicle in accordance with an illustrative embodiment.

Turning now to FIG. 2, an illustration of a block diagram of a ground vehicle is depicted in accordance with an illustrative embodiment. In this illustrative example, ground vehicle 200 is an example of a ground vehicle that may be used to implement ground vehicle 102 in FIG. 1.

In these depicted examples, ground vehicle 200 comprises platform 202. Platform 202 is a structure on which different systems and components may be associated with ground vehicle 200. A first component may be considered to be associated with a second component by being secured to the second component, bonded to the second component, fastened to the second component, and/or connected to the second component in some other suitable manner. The first component also may be connected to the second component by using a third component. The first component may also be considered to be associated with the second component by being formed as part of and/or an extension of the second component.

In this illustrative example, platform 202 may be, for example, chassis 204. Computer system 206, communications system 208, propulsion system 210, power system 212, sensor system 214, and weapons system 216 are associated with chassis 204.

Computer system 206 controls the operation of ground vehicle 200. Computer system 206 interacts with communications system 208, propulsion system 210, power system 212, sensor system 214, and weapons system 216 to exchange information 217 with these systems. Information 217 may include data, commands, and/or other suitable types of information.

In these illustrative examples, computer system 206 performs these operations by running number of control processes 218. A number, as used herein, refers to one or more items. For example, a number of control processes is one or more control processes. In these illustrative examples, number of control processes 218 runs to perform mission 220.

Mission 220 comprises number of tasks 222 and parameters 223. The grouping of number of tasks 222 to form mission 220 may vary, depending on the particular implementation. For example, in some illustrative embodiments, mission 220 may begin with a task performed after deployment of ground vehicle 200. Mission 220 may then end after number of tasks 222 has been completed and ground vehicle 200 is retrieved. Parameters 223 may be, for example, without limitation, waypoints, target locations, target identifications, data transmission rates, frequency of information transmission, and/or other suitable parameters.

In yet other illustrative embodiments, ground vehicle 200 may perform more than one task between being deployed and retrieved. A task within number of tasks 222 is one or more operations. For example, a task may involve travelling to a waypoint, obtaining sensor data for a target, sending sensor data back to a base station or other remote location, or performing some other suitable operation.

Propulsion system 210 moves ground vehicle 200 in response to commands 219 generated by number of control processes 218 running on computer system 206. Propulsion system 210 may maintain, increase, or decrease the speed at which ground vehicle 200 moves in response to commands 219 from number of control processes 218.

Power system 212 provides power to operate computer system 206, communications system 208, propulsion system 210, power system 212, sensor system 214, and weapons system 216. Sensor system 214 is a number of sensors used to collect sensor data 224 about the environment around ground vehicle 200. In these illustrative examples, sensor data 224 is generated by sensor system 214 and sent to number of control processes 218. Sensor data 224 may be used by number of control processes 218 to identify how and where ground vehicle 200 should move. Additionally, sensor system 214 also may gather information about a target for which surveillance may be performed.

Sensor system 214 also may transmit audio received by a microphone on board the vehicle in real-time. Transmitting the audio will enable a remote operator to gain a better situational awareness, as the audio may complement the live video imagery being received by the remote operator. For example, the sound of gunshots in the vicinity of the vehicle will help the operator assess a situation. When the radio transmission bandwidth is limited, the audio transmissions, as with the video transmissions, can be upon request as opposed to being continuous. Furthermore, the audio transmission feature would allow the remote operator to communicate with friendly parties who happen to be located in or near ground vehicle 200. A speaker microphone unit (not shown) may be part of communications system 208 in ground vehicle 200 and may be used for audio transmissions.

Communications system 208 provides communications between ground vehicle 200 and a remote location. This remote location may be, for example, a base station, a helicopter, a fixed-wing aircraft, another vehicle, or some other suitable location. Weapons system 216 is controlled by number of control processes 218. Weapons system 216 may be used to damage or destroy targets and/or protect ground vehicle 200 from damage. Weapons system 216 also may require operator input and may not be operated by number of control processes 218 without operator input.

In these illustrative embodiments, ground vehicle 200 may be used in the place of an unmanned aerial vehicle for performing mission 220. Ground vehicle 200 may be configured to perform operations over longer periods of time as compared to an unmanned aerial vehicle. For example, ground vehicle 200 can be operated for longer periods of time as compared to the time that an existing unmanned aerial vehicle can be operated in flight. Further, ground vehicle 200 may need to be charged less often than an unmanned aerial vehicle.

In the different illustrative embodiments, operation of ground vehicle 200 may require less expense, effort, and maintenance as compared to an unmanned aerial vehicle. For example, ground vehicle 200 may be operated autonomously without input from a human operator. In other words, ground vehicle 200 may not require the number of human operators typically involved in supporting and operating an unmanned aerial vehicle. Further, in these illustrative embodiments, ground vehicle 200 may have a lower detectability by detection systems as compared to an unmanned aerial vehicle.

The illustration of ground vehicle 200 in FIG. 2 is not meant to imply physical or architectural limitations to the manner in which other illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, ground vehicle 200 also may include a cabin or passenger area. This area may be present in case ground vehicle 200 transports passengers. Additionally, in some cases, ground vehicle 200 also may be controlled by an operator within the passenger area in addition to or in place of the control through number of control processes 218.

Number of control processes 218 controls the operation of ground vehicle 200 in these illustrative examples. Number of control processes 218 controls the operation of ground vehicle 200 without requiring operator input. In other words, an operator located in ground vehicle 200 or remote to ground vehicle 200 is not required for the operation of ground vehicle 200 to perform a mission.

Figure 3:
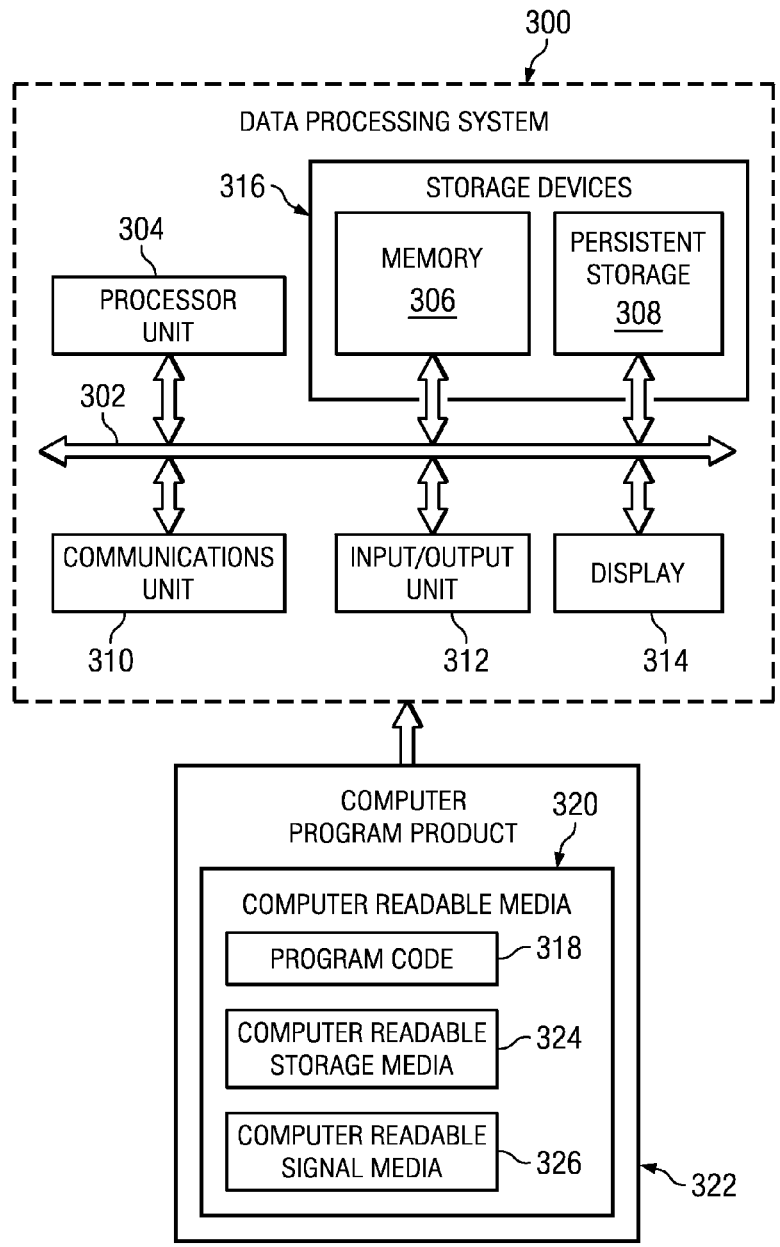
FIG. 3 is an illustration of a data processing system in accordance with an illustrative embodiment.

Turning now to FIG. 3, an illustration of a data processing system is depicted in accordance with an illustrative embodiment. Data processing system 300 is an example of one implementation for computer system 206 in FIG. 2.

In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device is any piece of hardware that is capable of storing information, such as, for example, without limitation, data, program code in functional form, and/or other suitable information either on a temporary basis and/or a permanent basis. Memory 306, in these examples, may be, for example, a random access memory or any other suitable volatile or non-volatile storage device.

Persistent storage 308 may take various forms, depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard, a mouse, and/or some other suitable input device. Further, input/output unit 312 may send output to a printer. Display 314 provides a mechanism to display information to a user. Display 314 may be omitted from data processing system 300 if ground vehicle 200 does not carry passengers and/or have an onboard operator.

Instructions for the operating system, applications, and/or programs may be located in storage devices 316, which are in communication with processor unit 304 through communications fabric 302.

In these illustrative examples, the instructions are in a functional form on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in processor unit 304. The program code in the different embodiments may be embodied on different physical or computer readable storage media, such as memory 306 or persistent storage 308.

Program code 318 is located in a functional form on computer readable media 320 that is selectively removable and may be loaded onto or transferred to data processing system 300 for execution by processor unit 304. In these illustrative examples, program code 318 may contain code or instructions for number of control processes 218. Further, program code 318 also may include information or data for mission 220 in FIG. 2.

Program code 318 and computer readable media 320 form computer program product 322 in these examples. In one example, computer readable media 320 may be computer readable storage media 324 or computer readable signal media 326. Computer readable storage media 324 may include, for example, an optical or magnetic disk that is inserted or placed into a drive or other device that is part of persistent storage 308 for transfer onto a storage device, such as a hard drive, that is part of persistent storage 308.

Computer readable storage media 324 also may take the form of a persistent storage, such as a hard drive, a thumb drive, or a flash memory that is connected to data processing system 300. In some instances, computer readable storage media 324 may not be removable from data processing system 300.

Alternatively, program code 318 may be transferred to data processing system 300 using computer readable signal media 326. Computer readable signal media 326 may be, for example, a propagated data signal containing program code 318. For example, computer readable signal media 326 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 318 may be downloaded over a network to persistent storage 308 from another device or data processing system through computer readable signal media 326 for use within data processing system 300. For instance, program code stored in a computer readable storage medium in a server data processing system may be downloaded over a network from the server to data processing system 300. The data processing system providing program code 318 may be a server computer, a client computer, or some other device capable of storing and transmitting program code 318.

The different components illustrated for data processing system 300 are not meant to provide physical or architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 300 is any hardware apparatus that may store data. Memory 306, persistent storage 308, and computer readable media 320 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

Figure 4:
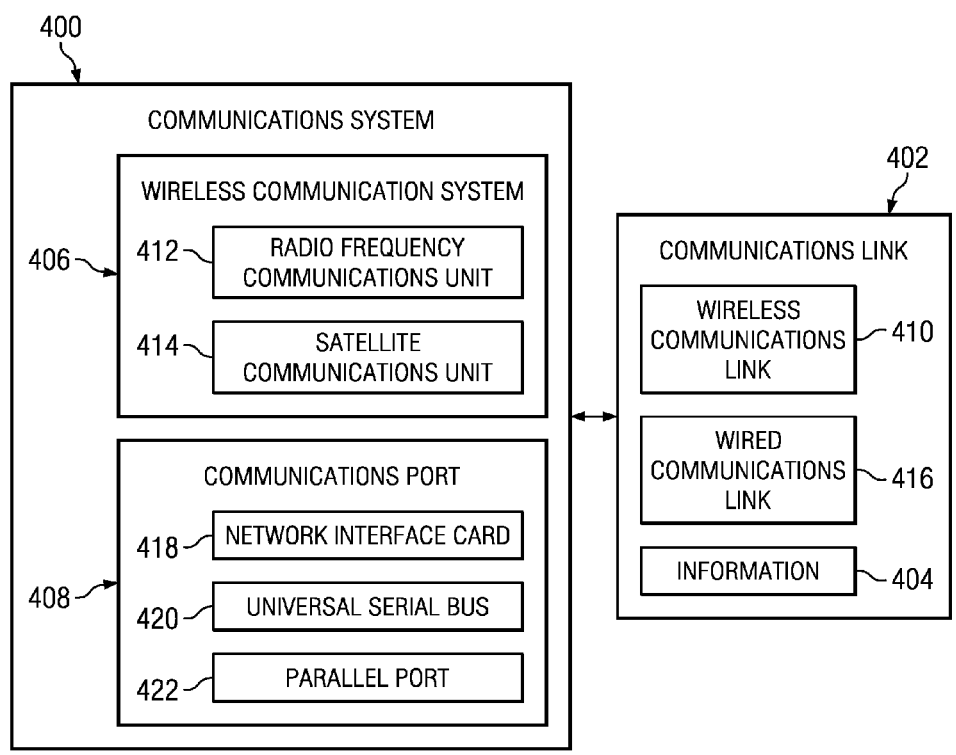
FIG. 4 is an illustration of a communications system in accordance with an illustrative embodiment.

With reference now to FIG. 4, an illustration of a communications system is depicted in accordance with an illustrative embodiment. Communications system 400 is an example of one implementation for communications system 208 in FIG. 2.

As illustrated, communications system 400 provides communications link 402 to exchange information 404 using communications link 402.

In these illustrative examples, communications system 400 includes wireless communication system 406 and communications port 408. Wireless communication system 406 uses communications link 402 in the form of wireless communications link 410. Wireless communication system 406 may include, for example, without limitation, radio frequency communications unit 412, satellite communications unit 414, and/or other suitable types of wireless communication systems.

Communications port 408 may be used to provide an exchange of information 404 using wired communications link 416. For example, communications port 408 may include, for example, network interface card 418, universal serial bus 420, parallel port 422, and/or other suitable types of devices that are used to establish communications link 402 in the form of wired communications link 416.

Figure 5:
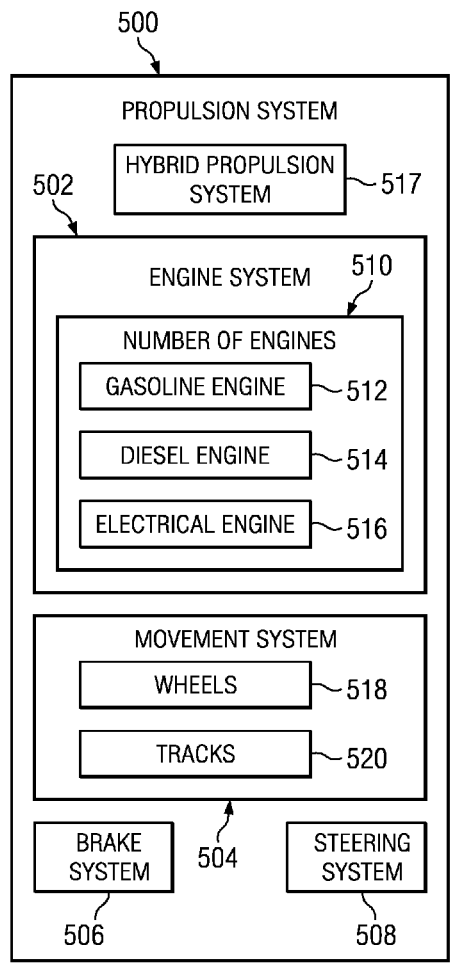
FIG. 5 is an illustration of a propulsion system in accordance with an illustrative embodiment.

Turning now to FIG. 5, an illustration of a propulsion system is depicted in accordance with an illustrative embodiment. Propulsion system 500 is an example of one implementation for propulsion system 210 in FIG. 2. In these illustrative examples, propulsion system 500 includes engine system 502, movement system 504, brake system 506, and steering system 508.

Engine system 502 provides power to operate movement system 504. In these illustrative examples, engine system 502 includes number of engines 510. Number of engines 510 may include, for example, without limitation, at least one of gasoline engine 512, diesel engine 514, electrical engine 516, and other suitable types of engines.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

In these illustrative examples, propulsion system 500 may take the form of hybrid propulsion system 517. When propulsion system 500 takes the form of hybrid propulsion system 517, engine system 502 includes two or more different types of engines. For example, engine system 502 may include gasoline engine 510 and electrical engine 516. Gasoline engine 512 may move the vehicle under normal conditions. Electrical engine 516 may be used to extend the range of the vehicle or provide for quieter operation of the vehicle.

Movement system 504 causes the movement of a vehicle in response to power applied to movement system 504 by engine system 502. Movement system 504 may include at least one of wheels 518, tracks 520, and other suitable types of movement mechanisms. Brake system 506 may be operated to slow down, stop, or hold a vehicle in place.

Steering system 508 controls the direction of movement for ground vehicle 200 in FIG. 2. Steering system 508 may take a number of different forms. For example, without limitation, steering system 508 may be an electrically controlled hydraulic steering system, an electrically controlled rack and pinion system, a skid steering system, a differential steering system, or some other suitable type of steering system capable of being controlled by a computer system. Further, in some illustrative embodiments, steering system 508 may be controlled by an operator using a joystick or some other suitable form of control device.

Figure 6:
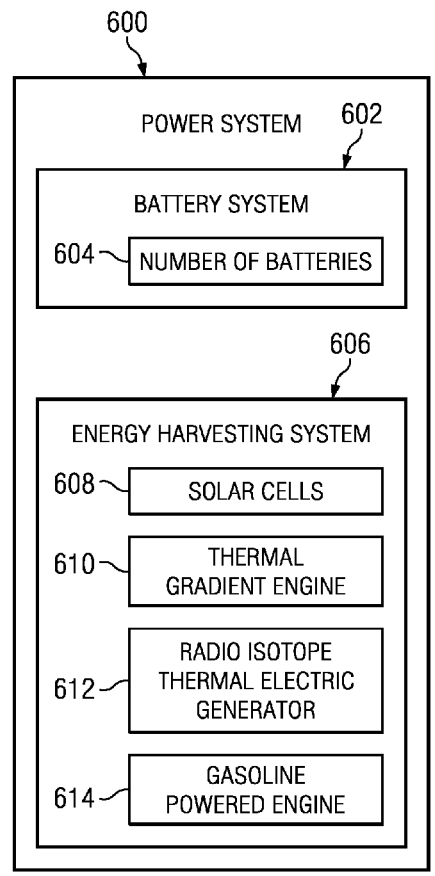
FIG. 6 is an illustration of a power system in accordance with an illustrative embodiment.

Turning now to FIG. 6, an illustration of a power system is depicted in accordance with an illustrative embodiment. In this illustrative example, power system 600 is an example of one implementation for power system 212 in FIG. 2.

As depicted, power system 600 includes battery system 602 and/or energy harvesting system 606. Battery system 602 contains number of batteries 604. In these examples, number of batteries 604 may be lithium batteries. Of course, any type of battery technology may be used for number of batteries 604 in battery system 602.

Number of batteries 604 may be charged by propulsion system 500 in FIG. 5. For example, number of engines 510 may charge number of batteries 604. Battery system 602 provides electrical energy in the form of an electrical current to various components within the vehicle.

Energy harvesting system 606 generates an electrical current to charge number of batteries 604. Energy harvesting system 606 generates the electrical current using the environment around or in the vehicle. As depicted, energy harvesting system 606 may comprise at least one of solar cells 608, thermal gradient engine 610, radio isotope thermal electric generator 612, gasoline powered engine 614, and other suitable types of energy harvesting systems.

For example, energy harvesting system 606 may comprise solar cells 608. Solar cells 608 may be deployed on the vehicle to generate electrical current when exposed to light. Thermal gradient engine 610 generates an electrical current based on a difference in temperature. For example, the temperature between the engine and the environment around the ground vehicle may be used to generate electrical current.

Radio isotope thermal electric generator 612 may generate an electrical current using a radioactive material. Heat from the radioactive material, as it decays, may be converted into electricity using an array of thermal couples. This type of source generates electrical current to charge battery system 602 through the environment within the ground vehicle. Gasoline powered engine 614 may be, for example, an internal combustion engine.

Figure 7:
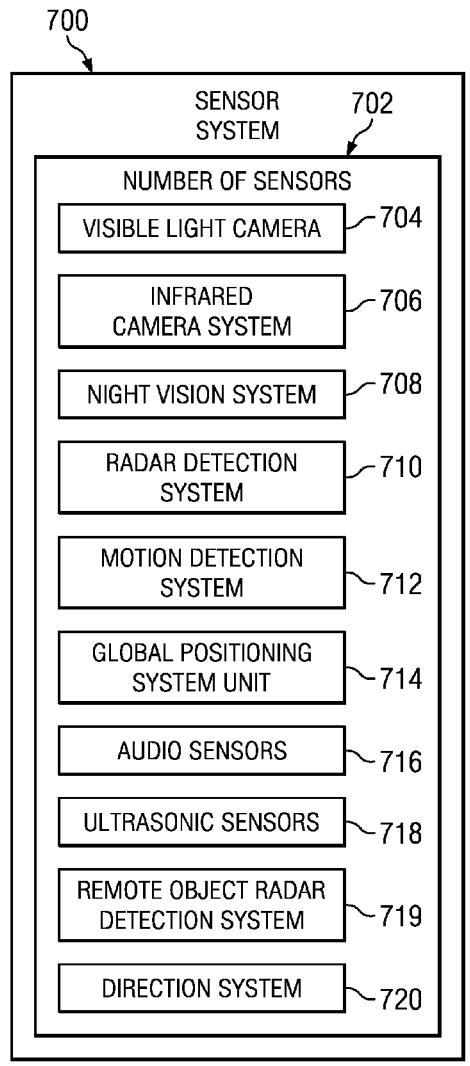
FIG. 7 is an illustration of a sensor system in accordance with an illustrative embodiment.

With reference now to FIG. 7, an illustration of a sensor system is depicted in accordance with an illustrative embodiment. Sensor system 700 is an example of one implementation for sensor system 214 in FIG. 2.

In this illustrative example, sensor system 700 comprises number of sensors 702. Number of sensors 702 includes at least one of visible light camera 704, infrared camera system 706, night vision system 708, radar detection system 710, motion detection system 712, global positioning system unit 714, audio sensors 716, ultrasonic sensors 718, remote object radar detection system 719, and/or other suitable types of sensors.

Visible light camera 704 generates video data in the visible light range. This range may be light having a wavelength from about 450 nanometers to about 750 nanometers. Infrared camera system 706 generates video data in longer wavelengths, such as about 14,000 nanometers. Night vision system 708 may include an image intensifier used to generate video data when light is lower than desired for use in generating video data with visible light camera 704.

Radar detection system 710 is a passive system that detects the presence of radio frequency signals used by a radar system. Motion detection system 712 detects movement in an area surrounding the vehicle in these examples.

Global positioning system unit 714 is a sensor that detects signals sent by satellites. These signals are used to identify the location of the vehicle. Global positioning system unit 714 generates a location, a speed, and a time by detecting these signals. The location may be in terms of latitude and longitude. The location also may include an elevation.

Audio sensors 716 may detect audio in and/or around the vehicle. Ultrasonic sensors 718 may detect objects at close ranges. For example, ultrasonic sensors 718 may detect objects within 10 feet, along with various types of short, medium, and long range radar for remote object detection. In some advantageous embodiments, remote object radar detection system 719 may be used for remote object detection. Direction system 720 may indicate the direction of the vehicle. Direction system 720 may be a compass, such as, for example, an electromagnetic compass or an inertial navigation unit.

Figure 8:
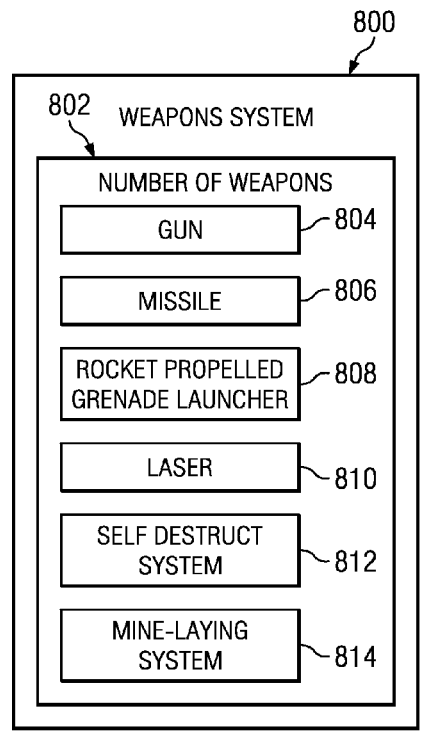
FIG. 8 is an illustration of a weapons system in accordance with an illustrative embodiment.

With reference now to FIG. 8, an illustration of a weapons system is depicted in accordance with an illustrative embodiment. Weapons system 800 is an example of one implementation for weapons system 216 in FIG. 2.

In this illustrative example, weapons system 800 includes number of weapons 802. Number of weapons 802 includes at least one of gun 804, missile 806, rocket propelled grenade launcher 808, laser 810, self destruct system 812, mine-laying system 814, and any other suitable types of weapons systems. Number of weapons 802 may be used to damage a target, destroy a target, protect ground vehicle 200 in FIG. 2 from damage, or destroy ground vehicle 200 to prevent acquisition of ground vehicle 200 by an undesired party.

In these illustrative examples, self destruct system 812 may be used to destroy a ground vehicle to prevent the ground vehicle from being acquired or controlled by an undesired operator or entity. Further, self destruct system 812 also may be used to cause damage to a target.

Figure 9:
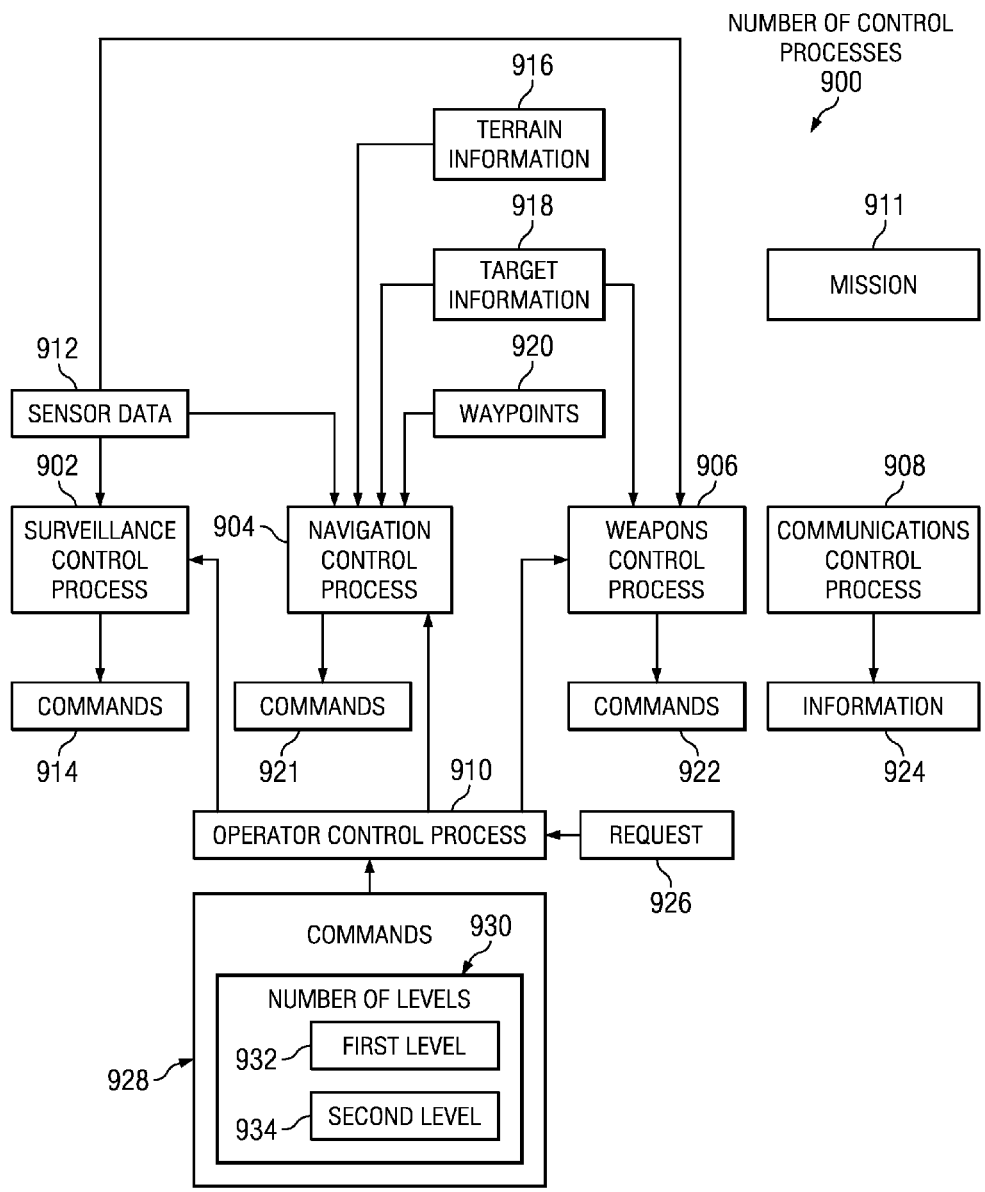
FIG. 9 is an illustration of a number of control processes in accordance with an illustrative embodiment.

Turning now to FIG. 9, an illustration of a number of control processes is depicted in accordance with an illustrative embodiment. Number of control processes 900 is an example of one implementation for number of control processes 218 in FIG. 2.

In this illustrative example, number of control processes 900 comprises at least one of surveillance control process 902, navigation control process 904, weapons control process 906, communications control process 908, and operator control process 910. Number of control processes 900 runs to perform mission 911.

Surveillance control process 902 controls sensor system 700 in FIG. 7 to perform surveillance operations. In these illustrative examples, surveillance control process 902 may move, turn on, turn off, and/or otherwise manipulate sensors within sensor system 700. Surveillance control process 902 may identify surveillance targets and record information from the sensor system. For example, surveillance control process 902 may select between visible light camera 704 and infrared camera system 706. Also, surveillance control process 902 may change the direction at which visible light camera 704 is pointed and control the zoom or magnification of the camera.

Surveillance control process 902 receives sensor data 912 from sensor system 700 in these examples. Surveillance control process 902 may generate commands 914 to control sensor system 700.

Navigation control process 904 also receives sensor data 912. Additionally, navigation control process 904 also uses at least one of terrain information 916, target information 918, and waypoints 920 to generate commands 921.

In these illustrative examples, terrain information 916 may include an identification of roads; trails; paths; traversable regions; obstacles, such as mountains and forests; and other types of terrain features. Additionally, target information 918 may include locations of a number of targets for which surveillance or other operations are to be performed. Waypoints 920 may identify locations to which the vehicle is to travel. These waypoints may form a path for the vehicle. Commands 921 are sent to propulsion system 210 in FIG. 2 to direct the movement of the vehicle.

In these examples, commands 921 also may include a command to request that control of the vehicle be changed to an operator. For example, when the vehicle encounters an obstacle that the system is unable to process or overcome, navigation control process 904 may slow down or halt movement of the vehicle and send a request that an operator take control of the vehicle.

Navigation control process 904 may have a number of levels of processing. For example, navigation control process 904 may be configured to navigate over various distances with the ability to avoid a variety of moving and stationary obstacles, including route adjustments required to make navigation decisions independent of an operator.

These distances may be, for example, over blocks, 10 miles, hundreds of times, or some other suitable distance. The term "autonomous" may be defined as a neural network or other type of control system which does not have to follow a set order of instructions. Autonomous networks and systems may have the ability to receive information and make decisions based on the information without further input from an operator.

Weapons control process 906 controls weapons system 800 in FIG. 8. Weapons control process 906 uses sensor data 912 and target information 918 to identify information about targets. Operator control process 910 may provide input to weapons control process 906 to actually activate or fire weapons in weapons system 800. In response to these inputs, weapons control process 906 generates commands 922 to operate weapons system 800.

Communications control process 908 exchanges information 924 with a remote location. Information 924 may include, for example, without limitation, sensor data 912, operator requests, programs, logs, and/or any other suitable types of information.

Operator control process 910 may interact with at least one of surveillance control process 902, navigation control process 904, and weapons control process 906 to selectively take control of one or more of the different control processes. Additionally, different levels of control may be performed. In these illustrative examples, more than one operator may send commands to operator control process 910.

Operator control process 910 allows different operators to control different control processes. For example, one operator may control surveillance control process 902 to control the surveillance performed by the vehicle. Another operator may control navigation control process 904 to control the movement and direction of the vehicle. Yet another operator may control weapons control process 906 to control the operation of the weapons system.

Operator control process 910 receives request 926 from an operator to control the vehicle. Operator control process 910 determines whether request 926 should be granted. Request 926 may include information used to determine whether request 926 should be granted. For example, without limitation, request 926 may include at least one of an access code, a user identifier, a key, a certificate, or some other suitable information.

If request 926 is granted, then commands 928 from the operator may be received by communications control process 908. Commands 928 may be used by operator control process 910 to control at least one of surveillance control process 902, navigation control process 904, and weapons control process 906. Commands 928 may be relayed directly to the control process that has been selected for control.

In these illustrative examples, commands 928 may have number of levels 930. Number of levels 930 may be a number of levels of control. For example, as depicted, first level 932 in commands 928 may be used to change parameters for a mission, such as waypoints 920 and/or target information 918. Second level 934 may cause a change in the direction of the vehicle or move a camera to another position. Of course, any number of levels may be present in number of levels 930.

For example, surveillance control process 902 may be programmed with target information 918 to perform surveillance on a particular target. In some cases, an operator may need to temporarily focus the surveillance on another target. Through operator control process 910, the operator may send input to surveillance control process 902 to follow another target. When the operator is done, the operator may then send a command to operator control process 910 to indicate that the control of the vehicle is no longer needed. Then surveillance control process 902 resumes operation.

In some cases, an operator may decide to change the course of movement of the vehicle. This control may occur at different levels with respect to navigation control process 904. In some illustrative embodiments, the operator may change any number of waypoints within waypoints 920.

In other illustrative embodiments, the operator may actually direct the vehicle based on sensor data 912 from sensor system 700. The direction of the vehicle may be controlled in real-time. This type of control may be used to move a vehicle around an obstacle that the vehicle is unable to navigate. With this type of control, waypoints are not changed.

Weapons control process 906 may be capable of identifying and locating targets. In these illustrative embodiments, the actual firing or activation of the weapons system by weapons control process 906 does not occur without operator input. Of course, in some illustrative embodiments, weapons could be automatically activated without operator input. Additionally, the operator may control a self destruct system using weapons control process 906 in these examples.

Operator control process 910 may be used by an operator located remotely to a vehicle or onboard within the vehicle.

In the different advantageous embodiments, number of control processes 900 may be implemented using program code. Number of control processes 900 may take a number of different forms, depending on the level of complexity of tasks and operations to be performed for mission 911. For example, number of control processes 900 may be part of an artificial intelligence system, a neural network, and/or other suitable types of programming systems and architectures. Further, number of control processes 900 may have access to local databases for use in decision making during operation.

For example, navigation control process 904 may direct the movement of the ground vehicle in a manner that avoids obstacles when moving from waypoint to waypoint. As a result, a navigation control process may direct the ground vehicle to move from one waypoint to another waypoint in a path that may not be straight or follow a road. Navigation control process 904 may aid the ground vehicle in avoiding obstacles, such as an abandoned vehicle in the road, a crater, a landslide, or other obstacles that may be present when traversing a path from one waypoint to another waypoint. Further, navigation control process 904 may direct the vehicle in other movements other than travelling from waypoint to waypoint. For example, without limitation, navigation control process 904 may direct a vehicle to follow an object, such as a truck, a person, or another suitable object that moves.

Figure 10:
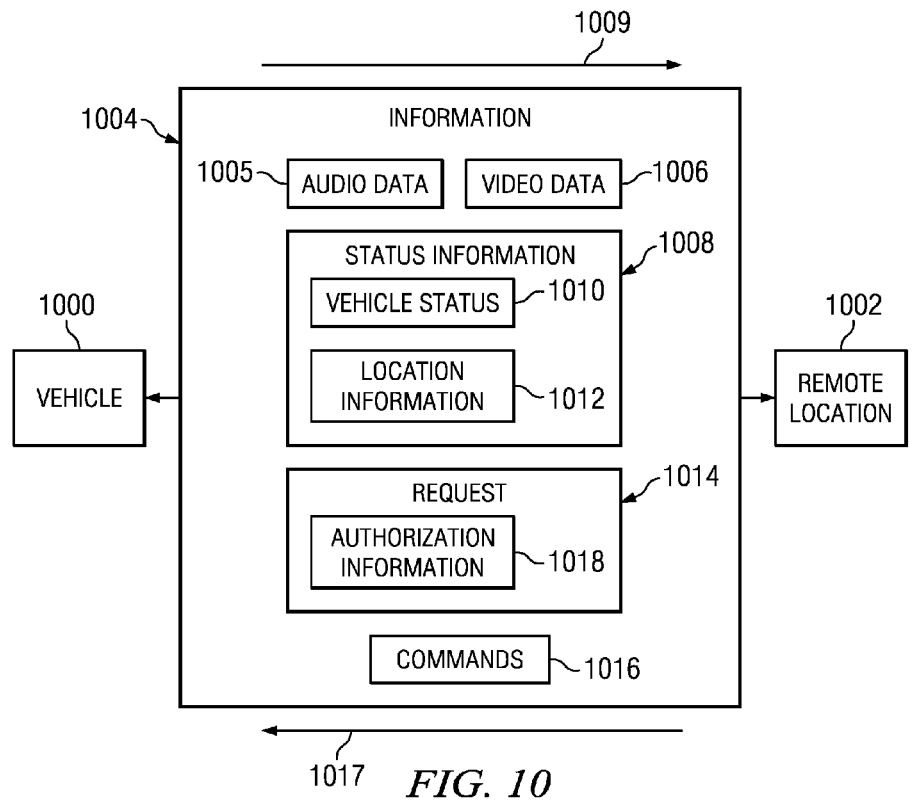
FIG. 10 is an illustration of information exchanged between a vehicle and a remote location in accordance with an illustrative embodiment.

With reference now to FIG. 10, an illustration of information exchange between a vehicle and a remote location is depicted in accordance with an illustrative embodiment. In this illustrative example, vehicle 1000 and remote location 1002 may exchange information 1004. Vehicle 1000 may be implemented using ground vehicle 200 in FIG. 2. Remote location 1002 may be, for example, without limitation, helicopter 106 in FIG. 1, base station 118, and/or some other suitable type of location remote to vehicle 1000.

Information 1004 includes audio data 1005, video data 1006, and status information 1008. In these examples, audio data 1005, video data 1006, and status information 1008 are sent from vehicle 1000 to remote location 1002 in uplink direction 1009. Audio data 1005 and video data 1006 may be data generated by sensor system 700 in FIG. 7.

Status information 1008 contains information about the vehicle. Status information 1008 may include, for example, without limitation, vehicle status 1010 and location information 1012. Vehicle status 1010 may include information, such as, for example, without limitation, power levels in the power system, warnings, indicators from other systems, a status of the mission, and/or other suitable information about the vehicle. Location information 1012 may include information about the location and direction of movement of the vehicle.

In these illustrative examples, information 1004 also may include request 1014 and commands 1016. Request 1014 and commands 1016 are sent in downlink direction 1017. Request 1014 is sent from remote location 1002 to vehicle 1000. Request 1014 is a request to operate the vehicle remotely or onboard by a human operator. Request 1014 also includes authorization information 1018. Authorization information 1018 is used by a vehicle to determine whether to allow control by the operator. Authorization information 1018 may include, for example, without limitation, a certificate, a password, a user identifier, a code, or some other type of authorization information. Commands 1016 are also part of information 1004. Commands 1016 are sent from remote location 1002 to vehicle 1000 to control operation of vehicle 1000.

The illustration of ground vehicle 200 in FIG. 2 and the different systems in FIGS. 3-10 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, propulsion system 500 may not include gasoline engine 512 or diesel engine 514. Instead, electrical engine 516 may be the only engine present within engine system 502. In still other illustrative embodiments, weapons system 800 may not be used in ground vehicle 200. Further, in still other illustrative embodiments, additional data processing systems, in addition to data processing system 300, may be implemented in computer system 206 for redundancy. For example, computer system 206 may include two or more systems, such as data processing system 300. Further, redundancy also may be present for other components within ground vehicle 200.

Figure 11:
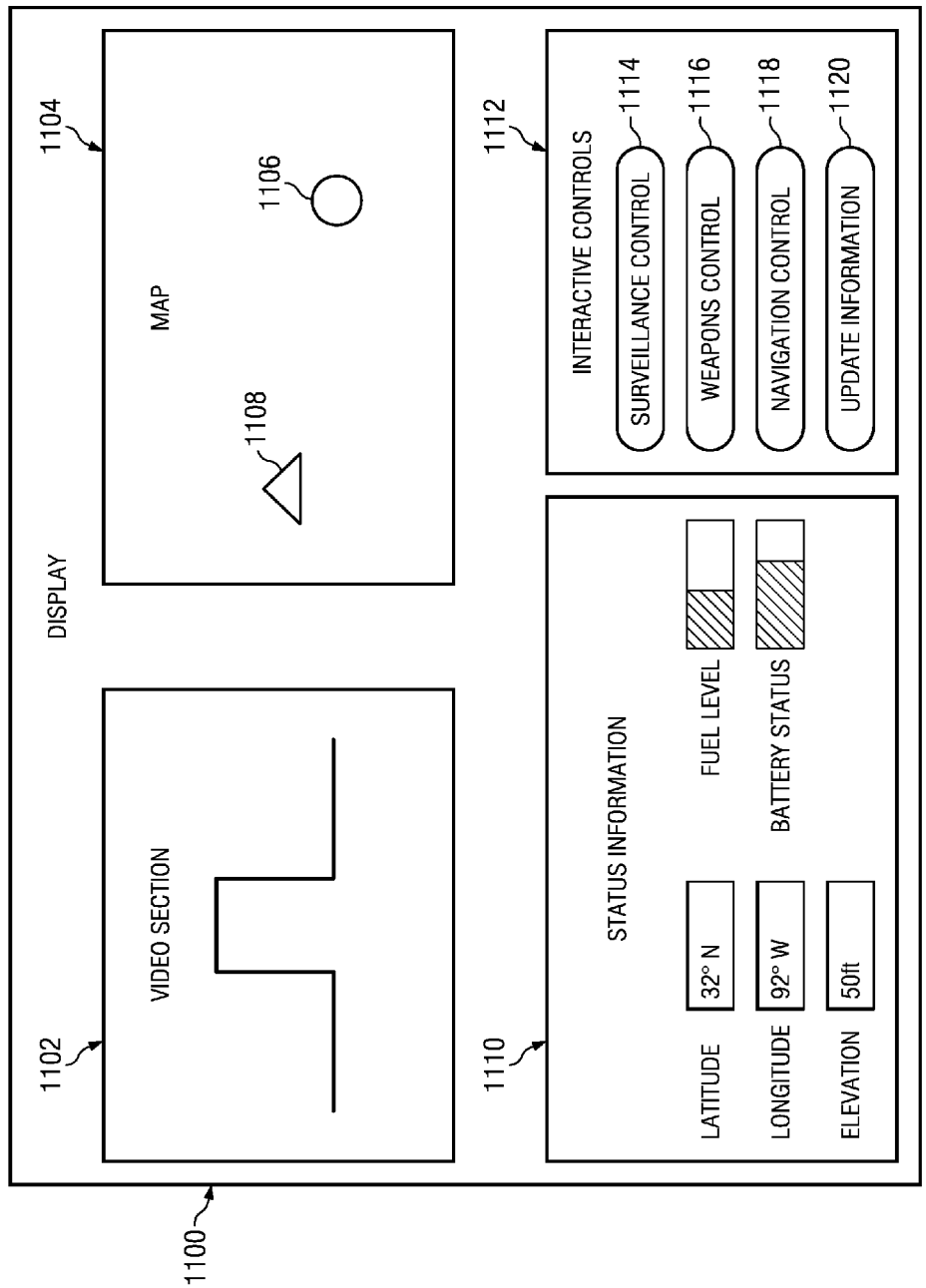
FIG. 11 is an illustration of an operator display in accordance with an illustrative embodiment.

With reference now to FIG. 11, an illustration of an operator display is depicted in accordance with an illustrative embodiment. In this illustrative example, display 1100 is an example of a display that may be presented on a data processing system, such as data processing system 300 in FIG. 3.

Display 1100 may be presented to an operator at a remote location. In this illustrative example, display 1100 includes video section 1102. Video section 1102 provides video data that is sent as it is generated by the vehicle. Video section 1102 may include video data generated by a missile launched from the vehicle. For example, video section 1102 may display indicators of a path of the missile and identifiers for when a target is locked. Video section 1102 also may display, upon request, the output of navigation video cameras and surveillance video cameras. When equipped with a gun, video section 1102 may display an image with cross-hairs corresponding to the direction in which the gun is pointed. The cross-hairs can be further enhanced with a zoom control in order to enable higher-precision aiming. The operator may use a joy-stick or similar control to swivel the gun for aiming. Firing may be accomplished by pressing a joy-stick button.

Map 1104 identifies the current location of the vehicle using vehicle identifier 1106. Target identifier 1108 identifies the position of the target relative to the vehicle. The presence of friendly and enemy forces may also be located on the map. Also, shown in the map may be the drop-off, pick-up, and other locations of mission significance. A zoom and pan control may enable a greater situational awareness when utilizing the map. Additionally, display 1100 also may include status information 1110. In this illustrative example, status information 1110 may include, for example, without limitation, latitude, longitude, elevation, fuel level, battery status, and/or other suitable information. Other types of information may include, for example, engine revolutions per minute, temperature, and ground speed.

Display 1100 may be viewed by the operator when controlling or monitoring the vehicle. As one example, the operator may control the vehicle using a joystick and map 1104 in display 1100. Display 1100 also may have interactive controls 1112. Interactive controls 1112 may include, for example, surveillance control 1114, weapons control 1116, navigation control 1118, update information 1120, or some other suitable type of interactive control. In these examples, interactive controls 1112 are display buttons responsive to touch, a mouse click, or some other type of control. For example, an operator may press weapons control 1116, which may allow the operator to control the weapons system on the vehicle. Further, the operator may control the weapons system using a joystick or some other form of control.

In some illustrative examples, an operator may press update information 1120 to update the computer system of the vehicle with new information. This information may include, for example, without limitation, new locations that the vehicle should avoid, new rules, new waypoints for the path of the vehicle, and/or other suitable types of information.

In some advantageous embodiments, display 1100 and/or some other suitable display may be presented to an operator in a head-mounted display device. In other advantageous embodiments, movement of the head of the operator may be used to control the content displayed in video section 1102 of display 1100. In still other advantageous embodiments, an operator may use a steering wheel, a brake pedal, and/or an accelerator pedal along with display 1100 to control movement of the vehicle.

Figure 12:
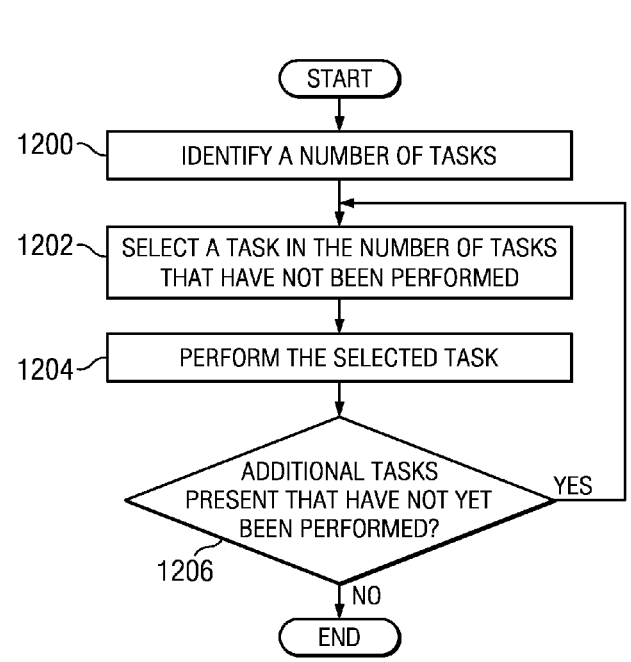
FIG. 12 is an illustration of a flowchart of a process for operating a ground vehicle in accordance with an illustrative embodiment.

With reference now to FIG. 12, an illustration of a flowchart of a process for operating a ground vehicle is depicted in accordance with an illustrative embodiment. The flowchart in FIG. 12 may be implemented in ground vehicle 200 in FIG. 2. In particular, this process may be implemented within number of control processes 218.

The process begins by identifying a number of tasks (operation 1200). Thereafter, a task in the number of tasks that have not been performed is selected (operation 1202). In these illustrative examples, the task may be in a sequential order. Additionally, some tasks may be performed parallel with other tasks. The process then performs the selected task (operation 1204). Each task within the number of tasks for the mission may be performed by a number of operations. For example, one task may be to move to a first waypoint. A second task may be to move to a second waypoint. A third task may be to perform surveillance of a target at the second waypoint. A fourth task may be to return to an extraction point after the surveillance has been completed.

After the task is completed, a determination is made as to whether additional tasks are present that have not yet been performed (operation 1206). If additional tasks are present, the process returns to operation 1202 to select the next unperformed task in the sequence of tasks. If additional tasks are not present, the process terminates. At this time, the mission has been completed.

Figure 13:
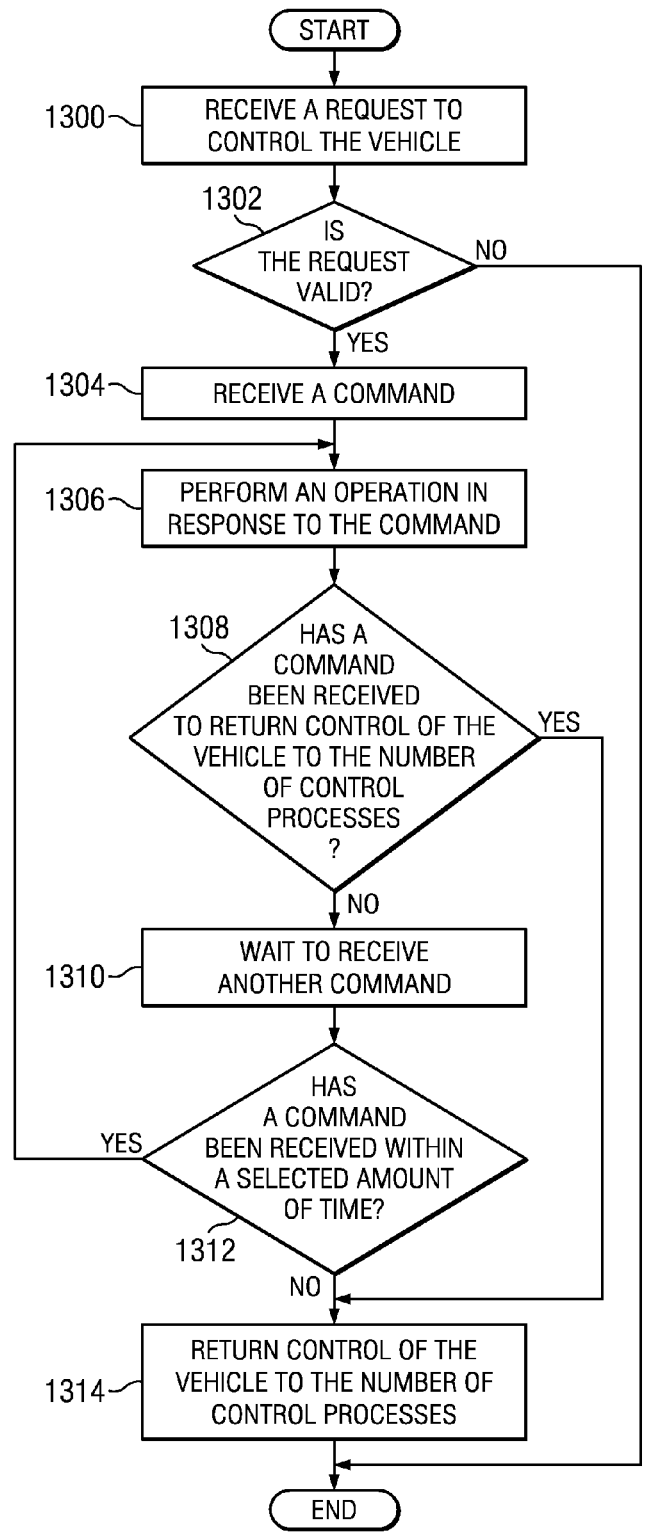
FIG. 13 is an illustration of a flowchart of a process for changing control of a vehicle from the number of control processes for the mission to an operator in accordance with an illustrative embodiment.

With reference now to FIG. 13, an illustration of a flowchart of a process for changing control of a vehicle from the number of control processes for the mission to an operator is depicted in accordance with an illustrative embodiment. The process illustrated in FIG. 13 may be implemented in ground vehicle 200 in FIG. 2. In these examples, the process may be implemented in operator control process 910 in FIG. 9.

The process begins by receiving a request to control the vehicle (operation 1300). A determination is made as to whether the request is valid (operation 1302). The determination of operation 1302 may be made using authorization information that may be sent as part of or after the request. The authorization information may be, for example, without limitation, a certificate, a password, a code, a user identifier, or some other suitable information that may be used to determine whether the request from the operator should be granted.

If the request is valid, the process then receives a command (operation 1304). The process then performs an operation in response to the command (operation 1306). The operation performed in operation 1306 overrides any operation that is being currently performed by the vehicle.

The process then determines whether a command has been received to return control of the vehicle to the number of control processes (operation 1308). If a command to release control of the vehicle has not been received, the process waits to receive another command (operation 1310). A determination is made as to whether a command has been received within a selected amount of time (operation 1312). If a command is received in the selected amount of time, the process returns to operation 1306 as described above.

Otherwise, if a command is not received in the selected amount of time, the process returns control of the vehicle to the number of control processes (operation 1314), with the process terminating thereafter. In other words, if an operator does not generate a command within some selected amount of time, the control of the vehicle by the operator is terminated and returned to the number of control processes. At this point, the operator may send another request to control the vehicle if control is desired.

With reference again to operation 1308, if a command is received to return control of the vehicle to the number of control processes, the process then continues to operation 1314 as described above, with the process terminating thereafter. With reference again to operation 1302, if the request is not valid, the process also terminates.

The commands received in operation 1306 may provide for different levels of control. For example, if the vehicle is performing surveillance on the target, the operator may temporarily select another target for surveillance. The command may be a command to move the camera to another direction. The command also may be to change the type of camera being used from a visible light camera to an infrared camera.

The command in operation 1306 may be to control navigation of the vehicle. For example, an operator may change waypoints for the vehicle. The waypoints may be changed by entering new coordinates for new waypoints and/or deleting old waypoints. In another level of control, the operator may actually view the video feed and directly operate the direction and movement of the vehicle. This type of control of the vehicle may be used to help the vehicle navigate and avoid obstacles. This type of control may be used especially when a vehicle encounters unexpected debris in the road, such as potholes, craters, abandoned vehicles, or other obstacles. The command in operation 1306 also may include commands to activate or use a weapon in a weapon system. For example, a gun may be moved and operated by a user. In another level of control, if a target is identified as being within range of a weapon, such as a missile, the operator may confirm that the missile should be launched.

The flowcharts and block diagrams in the different depicted embodiments illustrate the architecture, functionality, and operation of some possible implementations of apparatus and methods in different illustrative embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different illustrative embodiments provide a method and apparatus for a ground vehicle. In one illustrative example, a vehicle comprises a platform, a propulsion system, a communications system, a sensor system, and a computer system. The propulsion system is associated with the platform and configured to move the platform on the ground. The communications system is associated with the platform and configured to establish a wireless communications link to a remote location. In these examples, the sensor system is associated with the platform and configured to generate sensor data. The computer system also is associated with the platform and is configured to run a number of control processes. The number of control processes are run to perform a mission, send information over the wireless communications link to the remote location, receive a request to change control of the vehicle from the number of control processes to a number of operators, determine whether the request is valid, and perform a number of operations in response to a number of commands from the number of operators if the request is valid.

In this manner, the different illustrative embodiments provide a ground vehicle that is capable of performing a mission. The different illustrative embodiments also provide a capability to alter or temporarily change the mission. This change may be performed by a remote operator when a request is determined to be a valid request. The different illustrative embodiments provide for greater flexibility with this type of control. Further, the different illustrative embodiments also provide a power generation system that may be self-replenishing in the form of energy harvesting units. The energy harvesting units may extend the range or capability of the ground vehicle in performing various surveillance missions. These missions may be performed without the need for an operator to be located in the vehicle.

The description of the different illustrative embodiments has been presented for purposes of illustration and description, and it is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A vehicle comprising:
a platform deployable by a deployment vehicle;
a propulsion system connected to the platform and configured to move the platform on a ground;
a sensor system connected to the platform and configured to generate sensor data; and
a computer system connected to the platform, wherein the computer system is configured to run a plurality of control processes to perform a mission responsive to deployment of the vehicle by the deployment vehicle at a first location, and to perform a corresponding plurality of operations in response to a corresponding plurality of commands from a plurality of operators;
wherein the computer system is further configured to direct movement of the vehicle along a series of mission-defined waypoints to identify at least one mission objective;
wherein the computer system is further configured to receive a number of requests interrupting the mission to change control of the vehicle from the plurality of control processes to the plurality of operators, determine whether the number of requests is valid, perform the corresponding plurality of operations in response to the number of commands from the plurality of operators if the number of requests is valid, and return control of the vehicle from the plurality of operators to the plurality of control processes for resumption of the mission, wherein ones of the plurality of operators control different ones of the plurality of control processes such that a given operator controls a different control process relative to another operator, and wherein the plurality of operators are human operators; and
wherein the computer system is further configured, upon completion of the mission, to direct movement of the vehicle to a second location for retrieval by the deployment vehicle.

2. The vehicle of claim 1, wherein the computer system uses authorization information sent as part of each of the number of requests or sent after each the number of requests to determine whether each of the number of requests from the plurality of operators is valid, and wherein the authorization information is one of a certificate, a password, a code, and a user identifier; and wherein the plurality of control processes include a surveillance control process, a navigation control process, and a weapons control process.

3. The vehicle of claim 1, further comprising:
a communications system connected to the platform and configured to establish a wireless communications link to a remote location, wherein the computer system is configured to send information over the wireless communications link to the remote location.

4. The vehicle of claim 2, wherein the plurality of control processes is configured to return to performing the mission when there is an absence of the corresponding plurality of commands for longer than a selected period of time to return the control to the plurality of control processes.

5. The vehicle of claim 1, wherein the plurality of control processes comprises at least one of a surveillance control process, a navigation control process, a weapons control process, and an operator control process.

6. The vehicle of claim 1, wherein the corresponding plurality of operations comprises at least one of directing movement of the vehicle, changing waypoints for the vehicle, changing a number of targets for surveillance by the vehicle, causing the vehicle to self destruct, firing a weapons system, and changing the sensor data generated by the sensor system.

7. The vehicle of claim 1, wherein each of the plurality of operators controls a different control process in the plurality of control processes.

8. The vehicle of claim 1, wherein the plurality of operators comprises both an onboard operator and a remote operator, the onboard operator being physically aboard the platform.

9. The vehicle of claim 1 further comprising:
a self-destruct mechanism connected to the platform and configured to destroy the platform.

10. The vehicle of claim 1, wherein the corresponding plurality of commands have a corresponding plurality of levels of control.

11. The vehicle of claim 1, wherein the sensor system comprises:
a camera system configured to generate image data.

12. The vehicle of claim 1, wherein the sensor system comprises:
a global positioning system unit configured to generate location information.

13. The vehicle of claim 1, wherein the sensor system is configured to generate image data and location information.

14. The vehicle of claim 3, wherein the computer system is configured to send video data and status information over the wireless communications link to the remote location.

15. The vehicle of claim 14, wherein the status information comprises a at least one of a status of the vehicle and location information for the vehicle.

16. The vehicle of claim 1, wherein the propulsion system comprises at least one of a gasoline engine, a diesel engine, and an electrical engine.

17. The vehicle of claim 1 further comprising:
an energy harvesting system configured to generate power for the vehicle.

18. The vehicle of claim 5, wherein the navigation control process avoids obstacles and adjusts routes independent of a human operator.

19. An autonomous ground vehicle comprising:
a platform deployable by a deployment vehicle;
a propulsion system connected to the platform and configured to move the platform on a ground, wherein the propulsion system has two types of engines;
a communications system connected to the platform and configured to establish a wireless communications link to a remote location;
a sensor system connected to the platform and configured to generate sensor data;
a power system having a number of batteries and an energy harvesting system; and
a computer system connected to the platform, wherein the computer system is configured to run a plurality of control processes to perform a mission in response to deployment of the vehicle by the deployment vehicle at a first location, to direct movement of the vehicle along a series of mission-defined waypoints to identify at least one mission objective, to send information over the wireless communications link to the remote location, to receive a number of requests to change control of the autonomous ground vehicle from the plurality of control processes to a plurality of operators, to determine whether the number of requests is valid, to perform a corresponding plurality of operations in response to a corresponding plurality of commands from the plurality of operators if the number of requests is valid, to return control of the vehicle from the plurality of operators to the plurality of control processes for resumption of the mission, and upon completion of the mission, to direct movement of the vehicle to a second location for retrieval by the deployment vehicle;
wherein the computer system uses authorization information sent as part of each of the number of requests or sent after each the number of requests to determine whether each of the number of requests from the plurality of operators is valid, and wherein the authorization information is one of a certificate, a password, a code, and a user identifier;
wherein the plurality of operators are human operators;
wherein ones of the plurality of operators control different ones of the plurality of control processes such that a given operator controls a different control process relative to another operator;
wherein the plurality of control processes include a surveillance control process, a navigation control process, and a weapons control process.

20. A method for operating a vehicle, the method comprising:
loading a mission onto the vehicle, wherein the vehicle comprises a platform deployable by a deployment vehicle; a propulsion system connected to the platform and configured to move the platform on a ground; a sensor system connected to the platform and configured to generate sensor data; a power system having a number of batteries and an energy harvesting system; and a computer system connected to the platform, wherein the computer system is configured to run a plurality of control processes to perform the mission;
running the plurality of control processes to perform the mission in response to deployment of the vehicle by the deployment vehicle at a first location;
directing movement of the vehicle along a series of mission-defined waypoints to identify at least one mission objective;
responsive to receiving a request to change control of the vehicle from the plurality of control processes to a plurality of operators, the plurality of operators being all human, determining whether the request is valid;

responsive to a determination that the request is valid, performing a corresponding plurality of operations in response to a corresponding plurality of commands from the plurality of operators, wherein ones of the plurality of operators control different ones of the plurality of control processes such that a given operator controls a different control process relative to another operator; and returning control of the vehicle from the plurality of operators to the plurality of control processes for resumption of the mission, and upon completion of the mission, to direct movement of the vehicle to a second location for retrieval by the deployment vehicle.

21. The method of claim 20, wherein the vehicle further comprises a communications system connected to the platform and configured to establish a wireless communications link to a remote location and further comprising:

sending the sensor data from the sensor system over the wireless communications link to the remote location.

22. The method of claim 20 further comprising:

responsive to an absence of a command from the plurality of operators within a selected amount of time, returning the control of the vehicle to the plurality of control processes to perform the mission.

23. The method of claim 20, wherein each of the plurality of operators controls a different control process in the plurality of control processes.

24. The method of claim 20, wherein the plurality of operators comprises both an onboard operator and a remote operator, the onboard operator being physically aboard the platform.

25. The method of claim 20, wherein the corresponding plurality of commands have a number of levels of control.

26. The method of claim 20, wherein the corresponding plurality of operations comprises a self-destruct operation that is configured to destroy the platform.

* * * * *